United States Patent
Koyama et al.

(10) Patent No.: US 10,406,629 B2
(45) Date of Patent: Sep. 10, 2019

(54) METHOD FOR JOINING METAL MEMBERS

(71) Applicant: National University Corporation Gunma University, Maebashi-shi (JP)

(72) Inventors: Shinji Koyama, Maebashi (JP); Xiaojuan Ma, Maebashi (JP); Tatsunori Tsunetou, Maebashi (JP); Tsukasa Akiyama, Maebashi (JP); Yohei Tomikawa, Maebashi (JP)

(73) Assignee: NATIONAL UNIVERSITY CORPORATION GUNMA UNIVERSITY, Maebashi-shi (JP)

( * ) Notice: Subject to any disclaimer, the term of this patent is extended or adjusted under 35 U.S.C. 154(b) by 141 days.

(21) Appl. No.: 15/539,971

(22) PCT Filed: Dec. 21, 2015

(86) PCT No.: PCT/JP2015/085628
§ 371 (c)(1),
(2) Date: Jun. 26, 2017

(87) PCT Pub. No.: WO2016/104399
PCT Pub. Date: Jun. 30, 2016

(65) Prior Publication Data
US 2018/0264587 A1  Sep. 20, 2018

(30) Foreign Application Priority Data
Dec. 26, 2014 (JP) .................................. 2014-264109

(51) Int. Cl.
B23K 31/02 (2006.01)
B23K 20/16 (2006.01)
(Continued)

(52) U.S. Cl.
CPC ................ *B23K 20/16* (2013.01); *B23K 1/20* (2013.01); *B23K 20/02* (2013.01); *B23K 20/023* (2013.01);
(Continued)

(58) Field of Classification Search
CPC ...... B23K 20/16; B23K 20/023; B23K 20/24; B23K 20/2333; B23K 20/02;
(Continued)

(56) References Cited

U.S. PATENT DOCUMENTS 2,171,041 A * 8/1939 Martin ............... B23K 35/3603
148/26
3,167,405 A    1/1965 Muije et al.
(Continued)

FOREIGN PATENT DOCUMENTS

JP      55-57388 A      4/1980
JP    2006-95534 A      4/2006
(Continued)

OTHER PUBLICATIONS

Extended European Search Report dated Jul. 11, 2018 in Patent Application No. 15872967.3, 7 pages.
(Continued)

*Primary Examiner* — Kiley S Stoner
(74) *Attorney, Agent, or Firm* — Oblon, McClelland, Maier & Neustadt, L.L.P.

(57) ABSTRACT

To provide a method for joining metal members, in which joining can be performed at relatively lower temperature, and deformation caused when joining the metal members can be reduced. The present invention includes a step of joining a plurality of metal members with a sheet sandwiched between the joining surfaces of the plurality of metal members, wherein the sheet is obtained by forming an organic acid metal salt film on the surface of a metal sheet;
(Continued)

wherein aluminum or an aluminum alloy is used as the metal members, and a sheet made of any one of zinc, copper and magnesium is used as the metal sheet.

10 Claims, 10 Drawing Sheets

(51) Int. Cl.
*B23K 1/20* (2006.01)
*B23K 20/02* (2006.01)
*B23K 20/233* (2006.01)
*B23K 20/24* (2006.01)
*B23K 103/10* (2006.01)
*B23K 103/20* (2006.01)
*B23K 103/12* (2006.01)

(52) U.S. Cl.
CPC .......... *B23K 20/2333* (2013.01); *B23K 20/24* (2013.01); *B23K 2103/10* (2018.08); *B23K 2103/12* (2018.08); *B23K 2103/20* (2018.08)

(58) Field of Classification Search
CPC ............ B23K 2103/12; B23K 2103/20; B23K 2103/10; B23K 1/00–206; B23K 2103/30
USPC ........ 228/201–202, 205–209, 211, 223–224, 228/245–262, 262.41–262.44, 228/262.5–262.51, 262.6–262.61
See application file for complete search history.

(56) References Cited

U.S. PATENT DOCUMENTS

| | | | |
|---|---|---|---|
| 4,153,195 A | * | 5/1979 | Barozzi .................... B23K 1/19 228/183 |
| 6,085,965 A | | 7/2000 | Schwartz et al. |
| 2006/0076387 A1 | | 4/2006 | Ogure et al. |
| 2013/0216302 A1 | * | 8/2013 | Yanase ................ B23K 20/023 403/272 |
| 2014/0030634 A1 | | 1/2014 | Nanbu et al. |
| 2015/0001280 A1 | | 1/2015 | Nakagawa et al. |

FOREIGN PATENT DOCUMENTS

| | | | |
|---|---|---|---|
| JP | 2006-326612 A | | 12/2006 |
| JP | 2006-334652 A | | 12/2006 |
| JP | 2011-200930 A | * | 10/2011 |
| JP | 2011-200930 A | | 10/2011 |
| JP | 2013-176782 A | | 9/2013 |
| WO | WO 2012/029789 A1 | | 3/2012 |
| WO | WO 2013/183560 A1 | | 12/2013 |

OTHER PUBLICATIONS

International Search Report dated Mar. 15, 2016, in PCT/JP2015/085628 filed Dec. 21, 2015.
Office Action dated Jun. 28, 2018 in Korean Patent Application No. 10-2017-7017598 (with English translation), 6 pages.

* cited by examiner

METHOD FOR JOINING METAL MEMBERS

TECHNICAL FIELD

The present invention relates to a method for joining a plurality of metal members.

BACKGROUND ART

Conventionally, aluminum members are joined by brazing.

With the method of joining the aluminum members by brazing, since it is necessary to melt a brazing filler metal to thereby join the aluminum members (at a temperature of 580° C. to 620° C.), it will cause a positional accuracy problem, and the range of application of such method is limited. Further, in the method of joining the aluminum members by brazing, since a flux containing fluoride is used, it will cause a corrosion problem due to flux residue, not to mention that the flux is harmful to the human body; therefore, there is a desire to abolish such a method. Further, with the method of joining the aluminum members by brazing, since an intermetallic compound (which is a material having brittle property) is generated between the brazing filler metal and aluminum matrix, it will cause a problem that the joining portion will become brittle.

There are also other methods for joining metal members, such as laser welding, friction stir welding, and spot welding.

In these joining methods by welding, the area near the welding portion will become soft due to welding heat, and micro fissure will occur. Further, it will cause a corrosion problem due to clearance of the joining portion.

Further, due to high thermal conductivity of aluminum, large amount of power (i.e., heat input) is necessary.

As one of other methods for joining metal members, there is known a solid-phase diffusion joining method.

The solid-phase diffusion joining method is a method of heating and pressurizing the metal members to thereby join the metal members without melting the matrix and without causing noticeable deformation in solid-phase state. The feature of the solid-phase diffusion joining method is that the heat damage to the metal members can be reduced, wet spreading can be suppressed because the matrix is not molted, and precision assembly joining is possible.

However, in the case where the metal members are made of a metal likely to be oxidized, if the metal members are exposed to the atmospheric air, a hard natural oxide film (which is a joining inhibiting factor) will be formed on the surface of the metal members. In order to obtain a strong joining portion, it is necessary to increase joining pressure and joining temperature to mechanically break the oxide film, and that will inevitably increase deformation amount caused when joining the metal members.

To solve such problem, it is proposed that the joining surfaces of copper is treated with an oxide film removing liquid formed of an organic acid before performing solid-phase joining (see PTL 1, for example).

Further, it is proposed to pressurize to join the metal members with a sheet-like member sandwiched between the joining surfaces of the metal members, wherein the sheet-like member is made of a material (such as copper, zinc, silver, a copper alloy, a zinc alloy, a silver alloy, or silicon) that generates an eutectic reaction with aluminum (see PTL 2 and PTL 3, for example).

CITATION LIST

Patent Literature

PTL 1: Japanese Unexamined Patent Application Publication No. 2006-334652
PTL 2: Japanese Unexamined Patent Application Publication No. S55-57388
PTL 3: WO 2012/029789

SUMMARY OF INVENTION

Technical Problem

However, in the case where the metal members are made of aluminum or the like, if the surface is only treated with an organic acid before performing the solid-phase joining (in the same manner as treating copper with an organic acid as described in PTL 1), sufficient joining strength cannot be obtained.

Further, in the case where the aluminum members are joined with a sheet-like member sandwiched therebetween wherein the sheet-like member is made of a metal or an alloy of the metal, as is described in PTL 2 and PTL 3, sufficient joining strength of aluminum cannot be obtained.

To solve the aforesaid problems, an object of the present invention is to provide a method for joining metal members, in which joining can be performed at relatively lower temperature, and deformation caused when joining the metal members can be reduced.

Solution to Problem

A method of joining metal members according to an aspect of the present invention comprises: joining a plurality of metal members to each other with a sheet sandwiched between joining surfaces of the metal members, wherein the sheet is obtained by forming an organic acid metal salt film on the surface of a metal sheet, wherein aluminum or an aluminum alloy is used as the metal members, and wherein a sheet made of any one of zinc, copper and magnesium is used as the metal sheet.

The aforesaid method of joining metal members further comprises: preparing the sheet by boiling the metal sheet in an organic acid to thereby form an organic acid metal salt film on the surface of the metal sheet.

The aforesaid method of joining metal members further comprises: preparing the sheet by spraying or applying an organic acid to the metal sheet to thereby form an organic acid metal salt film on the surface of the metal sheet.

Advantageous Effects of Invention

According to the aforesaid present invention, high joining strength can be achieved at lower joining temperature than conventional methods.

With the present invention, it becomes possible to reduce joining temperature, reduce the energy necessary for heating the metal members, and reduce deformation amount caused when joining the metal members.

DESCRIPTION OF EMBODIMENTS

An embodiment for implementing the present invention (referred to as "the embodiment" hereinafter) will be described below in the following order.
1. Summary of the present invention
2. Embodiments
3. Examples

1. Summary of the Present Invention

First, the present invention is summarized as below.

The metal member joining method according to the present invention is a method for joining a plurality of metal members.

The present invention includes a step of joining a plurality of metal members with a sheet sandwiched between the joining surfaces of the plurality of metal members, wherein the sheet is obtained by forming an organic acid metal salt film on the surface of a metal sheet; wherein aluminum or an aluminum alloy is used as the metal members, and a sheet made of any one of zinc, copper and magnesium is used as the metal sheet.

The present invention may further include a step of producing a sheet by boiling a metal sheet in an organic acid to thereby form an organic acid metal salt film on the surface of the metal sheet, or a step of producing a sheet by spraying or applying an organic acid to a metal sheet to thereby form an organic acid metal salt film on the surface of the metal sheet.

By performing such step, it is possible to form an organic acid metal salt film on the surface of the metal sheet wherein the organic acid salt metal is an organic acid salt of the metal identical to material of the metal sheet.

However, in the present invention, since a sheet obtained by forming an organic acid metal salt film on surfaces of a metal sheet is used, it is also possible to use a sheet prepared separately in advance or a sheet prepared by another person. In such cases, the aforesaid step of producing the sheet by forming an organic acid metal salt film on the surface of the metal sheet is omitted.

The plurality of metal members to be joined may either be made of the same material or be made of different materials as long as these materials fall in a range of aluminum or aluminum alloy. Among these materials, combinations of the different materials include, for example, a combination of a pure metal and an alloy, a combination of different alloys whose constituent elements other than aluminum are different from each other, a combination of different alloys whose alloy compositions are different from each other, and the like.

Figure 15:
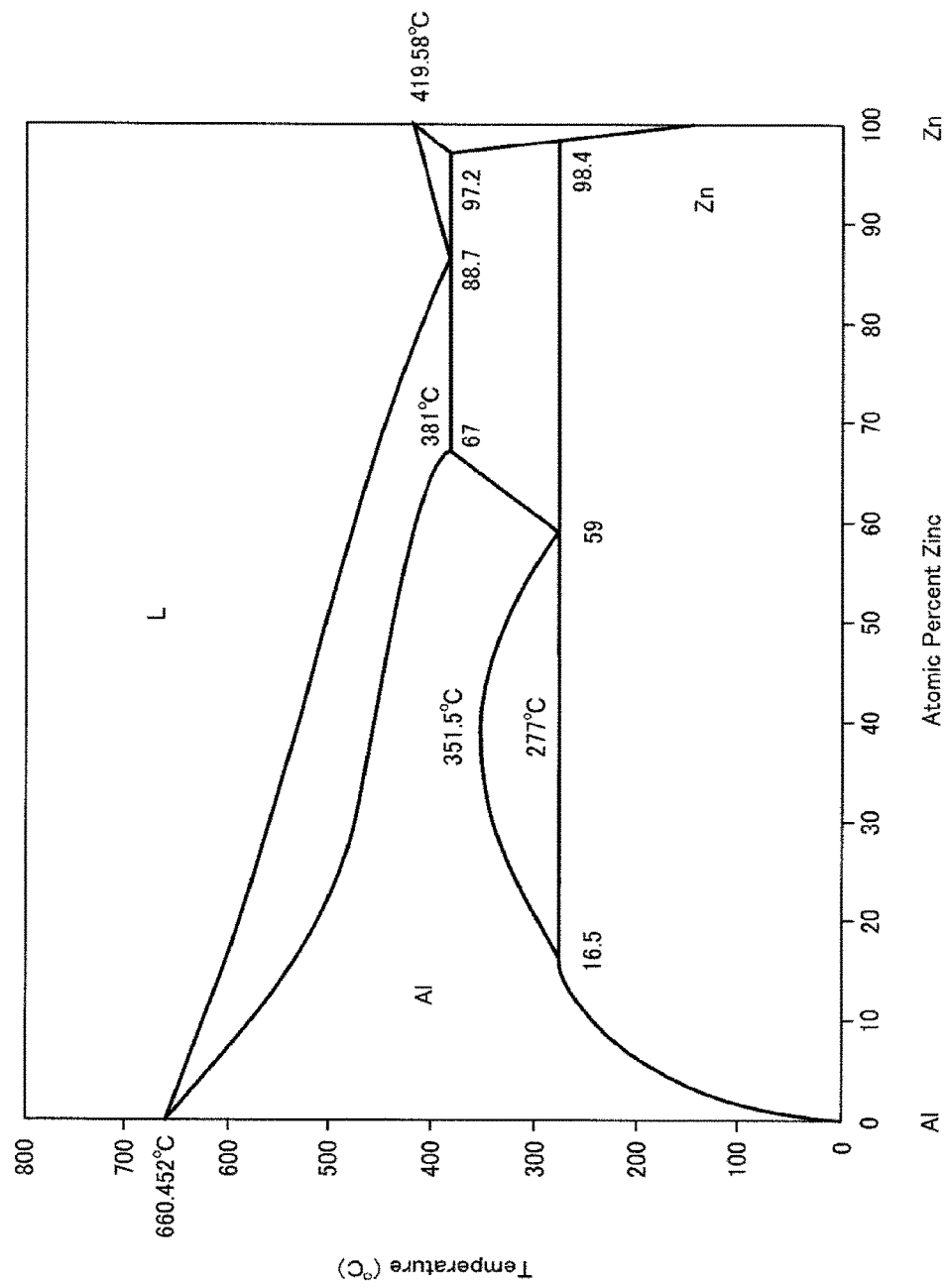
FIG. 15 is a phase diagram of Al—Zn system.

Here, a phase diagram of Al—Zn system is shown in FIG. 15.

It is known from FIG. 15 that, at a temperature of about 400° C., zinc Zn has a high solid solubility limit to aluminum Al (maximum of 67 atom % at 381° C.)

Other elements than zinc may also be used as the material of the metal sheet as long as such elements have high solid solubility limit to aluminum. Examples of the elements having high solid solubility limit to aluminum include, for example, copper, magnesium, calcium, silver and the like. Among these elements, the present invention can be applied to copper, magnesium and the like, to which the organic acid treatment is effective.

In the present invention, various kinds of organic acid can be used as the aforesaid organic acid.

For example, one or more materials selected from a group consisting of formic acid, acetic acid, citric acid, and stearic acid can be used as the organic acid.

In the present invention, it is possible to increase joining strength by joining a plurality of metal members (aluminum or an aluminum alloy) with a sheet sandwiched between the joining surfaces of the plurality of metal members, wherein the sheet is obtained by forming an organic acid metal salt film on the surface of a metal sheet.

Since high joining strength can be achieved in such manner, it is possible to achieve high joining strength at lower temperature than conventional methods.

In a step of heating and pressurizing the metal members to join the metal members, a pyrolysis reaction will occur in the organic acid metal salt film (a film of zinc formate or the like) formed on the surface of the sheet, so that the atomic plane of the metal of the sheet and the atomic plane of the aluminum are exposed, and therefore compatibility can be improved, metallic contact area between the metal members and the sheet can be increased, and high joining strength can be achieved.

As described above, according to the present invention, since high joining strength can be achieved at lower temperature than conventional methods, it becomes possible to join the metal members in solid-phase state or partially liquid-phase state at lower temperature.

From a point of view similar to temperature, it becomes possible to achieve sufficiently high joining strength even with reduced pressure when joining the metal members.

Thus, it becomes possible to join the metal members in solid-phase state or partially liquid-phase state at lower pressure, and therefore deformation amount caused when joining metal members can be reduced, so that positional accuracy of jointing can be improved. Further, by improving positional accuracy of jointing, high positional accuracy can be maintained, so that it becomes possible to join metal members with complicated shapes, which were difficult to be joined by welding.

Further, since the metal members can be joined at lower temperature and lower pressure, it is possible to simplify the structure of the joining device and reduce the energy necessary for heating the metal members to thereby improve energy efficiency. For example, it is possible to reduce power consumption, fuel for heating, time required to join the metal members, and the like.

Further, according to the present invention, since a sheet having an organic acid metal salt film formed on its surface is sandwiched between the two joining surfaces of the plurality of metal members, it is easier to form an organic acid salt film on the surface of the sheet than to form an organic acid salt film on the plurality of metal members to be joined.

Thus, it becomes possible to join the metal members with high positional accuracy even if the metal members have complicated shapes and/or large dimensions.

Further, according to the present invention, since it becomes possible to join aluminum members, which was difficult to be achieved with conventional solid-phase joining methods, excellent recyclability can be achieved.

Despite many advantages of aluminum such as good thermal conductivity, good electrical conductivity and light weight, the usage of aluminum has been avoided because it is difficult to join aluminum members due to the hard oxide film; however, with the joining method according to the present invention, it becomes possible to join aluminum to various structural members.

2. Embodiments

Figure 1:
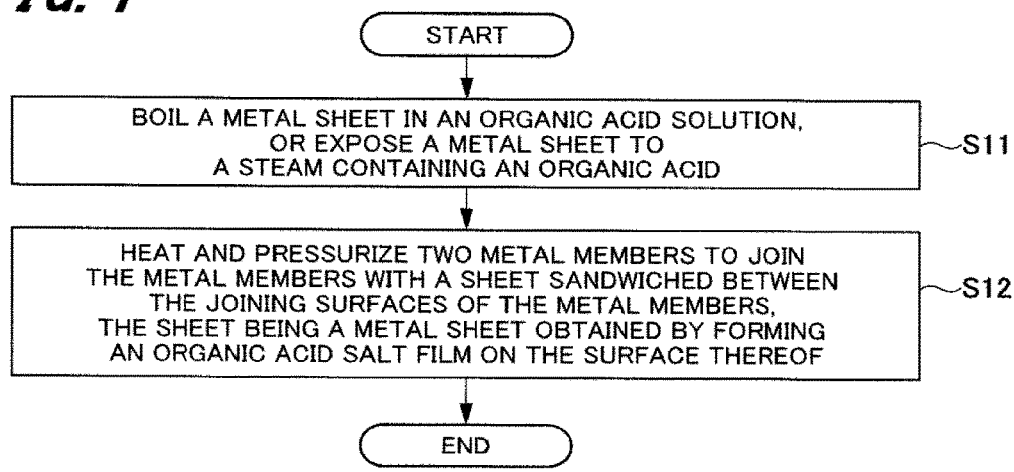
FIG. 1 is a flowchart showing the steps of a method for joining metal according to an embodiment of the present invention.

FIG. 1 is a flowchart showing the steps of a method of joining metal according to an embodiment of the present invention.

As shown in FIG. 1, first, in step S11, a metal sheet is boiled in an organic acid solution, or exposed to a steam containing an organic acid.

By performing step S11, an organic acid salt film is formed on the surface of the metal sheet.

A sheet made of any one of zinc, copper, and magnesium may be used as the metal sheet.

Formic acid, citric acid, stearic acid or other organic acids may be used as the organic acid. Water or various polar solvents may be used as a solvent.

Next, in step S12, two metal members are heated and pressurized to be joined with the sheet obtained in step S11 sandwiched between the joining surfaces of the two metal members.

By performing step S12, since the metal members are heated and pressurized in a state where contaminated layer of the surface thereof is removed or substituted by the organic acid salt, and since the organic acid salt is decomposed due to the pyrolysis reaction occurred therein, the atomic plane of the metal atom of the first metal member is exposed, so that joining strength can be increased. Since high joining strength is obtained, it becomes possible to achieve high joining strength at lower temperature and with less deformation amount than conventional methods.

In other words, with the method according to the present invention, it becomes possible to reduce both the heating temperature and the pressure necessary for joining the metal members, compared with a conventional method of directly joining the metal members without using the metal sheet or a conventional method of joining the metal members using a sheet having no organic acid salt film formed on the surface thereof.

Aluminum or an aluminum alloy may be used as the metal members.

The two metal members may either be made of the same material, or be made of different materials as long as these materials fall in a range of aluminum and aluminum alloy.

In step S11 of the present embodiment, formic acid, acetic acid, citric acid, or stearic acid, for example, may be used as the organic acid.

An organic acid salt film can be formed on the surface of the metal sheet by using such organic acid.

The present embodiment may also include a step of washing the metal sheet with pure water, alcohol or the like and a step of drying the metal sheet, according to necessity.

By performing the aforesaid steps of the present embodiment, an organic acid salt film can be formed on the surface of the metal sheet by boiling the metal sheet in an organic acid solution, or by exposing the metal sheet to a steam containing an organic acid.

Further, by heating and pressurizing the two metal members to join the two metal members with a sheet sandwiched between the joining surfaces of two metal members wherein the sheet is obtained by forming an organic acid salt film on the surface of a metal sheet, the organic acid salt will be decomposed due to the pyrolysis reaction occurred therein, and therefore the atomic plane of the metal atom of the metal members are exposed, so that joining strength can be increased.

Thus, since high joining strength can be achieved, high joining strength can be achieved with lower temperature, and therefore it is possible to reduce the heating temperature when joining the metal members compared with a conventional case where the sheet is not used or a conventional case where there is no step for treating a metal sheet with an organic acid. In other words, it becomes possible to join the metal members in solid-phase state at lower temperature.

Further, since sufficiently high joining strength can be achieved with lower pressure when joining the metal members, it becomes possible to join the metal members in a solid-phase state with lower pressure, and therefore it is possible to reduce deformation amount when joining the metal members, so that positional accuracy of jointing can be improved. Further, by improving positional accuracy of jointing, high positional accuracy can be maintained, so that it becomes possible to join metal members with complicated shapes, which were difficult to be joined by welding.

Further, since it becomes possible to join the metal members at lower temperature and lower pressure, energy efficiency can be improved. For example, it becomes possible to reduce power consumption, fuel for heating, time required to join the metal members, and the like.

Incidentally, in the case where a sheet prepared separately in advance is used or a case where a sheet prepared by another person is used, step S11 in the flowchart of FIG. 1 will be omitted.

3. Examples

Next, joining of metal members according to the present invention has been actually performed, and the properties thereof have been investigated.

(Experiment 1) Joining of A5052 Aluminum Alloy

Figure 2:
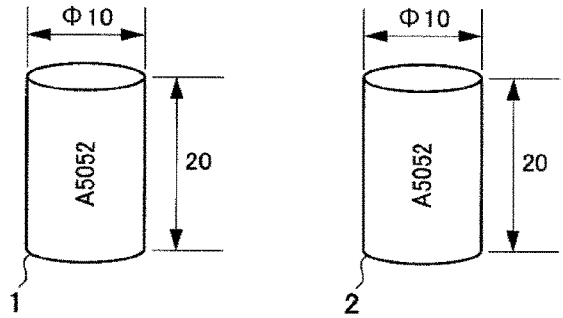
FIG. 2 is a perspective view of a sample of A5052 aluminum alloy used in Experiment 1.

As shown in the perspective view of FIG. 2, two A5052 aluminum alloys 1, 2 each having a cylindrical shape with a diameter of 10 mm and a height of 25 mm were prepared as the two metal members to be joined.

The joining surfaces of the two A5052 aluminum alloys 1, 2 were electrolytically polished.

The chemical composition of the A5052 aluminum alloys 1, 2 to be used is listed in the following Table 1.

TABLE 1

| | Elements | | | | | | |
|---|---|---|---|---|---|---|---|
| | Si | Fe | Cu | Mn | Mg | Cr | Zn | Al |
| Mass % | 0.18 | 0.22 | 0.03 | 0.03 | 2.6 | 0.18 | 0.02 | Bal. |

The size of a zinc sheet is: breadth 12 mm×length 12 mm; and the zinc sheet has a predetermined thickness within a range of 0.1 mm to 2.0 mm.

Samples were prepared by the following method respectively for cases of: with organic acid treatment; without organic acid treatment; and without sheet.

(With Organic Acid Treatment)

A sample was prepared using a zinc sheet having been subjected to an organic acid treatment.

First, a zinc sheet was delipidated by being subjected to ultrasonic cleaning in acetone.

Next, the zinc sheet was boiled in a 98% formic acid for a predetermined time within a range of 2 to 8 minutes.

Thereafter, the zinc sheet was washed for 10 seconds with distilled water, and thereby a sheet obtained by treating a zinc sheet with an organic acid was prepared.

Figure 3:
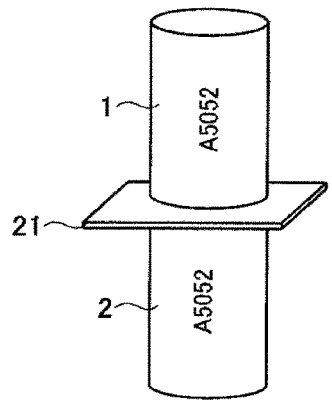
FIG. 3 is a perspective view showing a joining state in Experiment 1.

Next, as shown in the perspective view of FIG. 3, two A5052 aluminum alloys 1, 2 were heated and pressurized so as to be joined with a sheet 21 sandwiched therebetween the joining surfaces of the two A5052 aluminum alloys 1, 2.

The joining was kept in a nitrogen atmosphere for a joining time of 15 minutes, with a joining pressure of 12 MPa, and at a predetermined joining temperature within a range of 400 to 440° C., so that a joint was prepared.

(Without Organic Acid Treatment)

As a comparison, another sample was prepared using a zinc sheet not subjected to an organic acid treatment.

As shown in the perspective view of FIG. 3, two A5052 aluminum alloys 1, 2 were heated and pressurized so as to be joined with a sheet 21 sandwiched between the joining surfaces of the two A5052 aluminum alloys 1, 2, wherein a zinc sheet not subjected to an organic acid treatment was used as the sheet 21.

The joining was kept in a nitrogen atmosphere for a joining time of 15 minutes, with a joining pressure of 12 MPa, and at a predetermined joining temperature within a range of 400 to 440° C., so that a joint was prepared.

(Without sheet)

As a comparison, further another sample was prepared by joining two metal members without using a zinc sheet.

Two A5052 aluminum alloys 1, 2 were directly abutted on each other and joined by being heated and pressurized.

The joining was kept in a nitrogen atmosphere for a joining time of 15 minutes, with a joining pressure of 12 MPa, and at a predetermined joining temperature within a range of 400 to 440° C., so that a joint was prepared.

(Tensile Test)

A gripper was attached to one of the metal members of the joint obtained by joining the two metal members, to perform a tensile test.

The tensile test was performed using a tensile testing machine 5567 manufactured by INSTRON. Incidentally, tensile tests described below were all performed using the same tensile testing machine.

(Discussion on Optimal Treatment Time)

First, discussion on optimal treatment time in formic acid was made as below.

Sheets 21 used to join the metal members were prepared respectively for different formic acid treatment times of: 0 minute (i.e., without treatment), 2 minutes, 5 minutes and 8 minutes, while the thickness of the zinc sheets was fixed to 0.1 mm.

Further, two A5052 aluminum alloys 1, 2 were joined to each other with the sheet 21 sandwiched between the two joining surfaces of the two A5052 aluminum alloys 1, 2. The joints were prepared by joining the two A5052 aluminum alloys 1, 2 for each of the sheets having aforesaid different formic acid treatment times, at joining temperature of 400° C. and joining temperature of 440° C. respectively.

The tensile test was performed to measure the tensile strength σ for each of the joints obtained by joining the two A5052 aluminum alloys 1, 2.

Figure 4A:
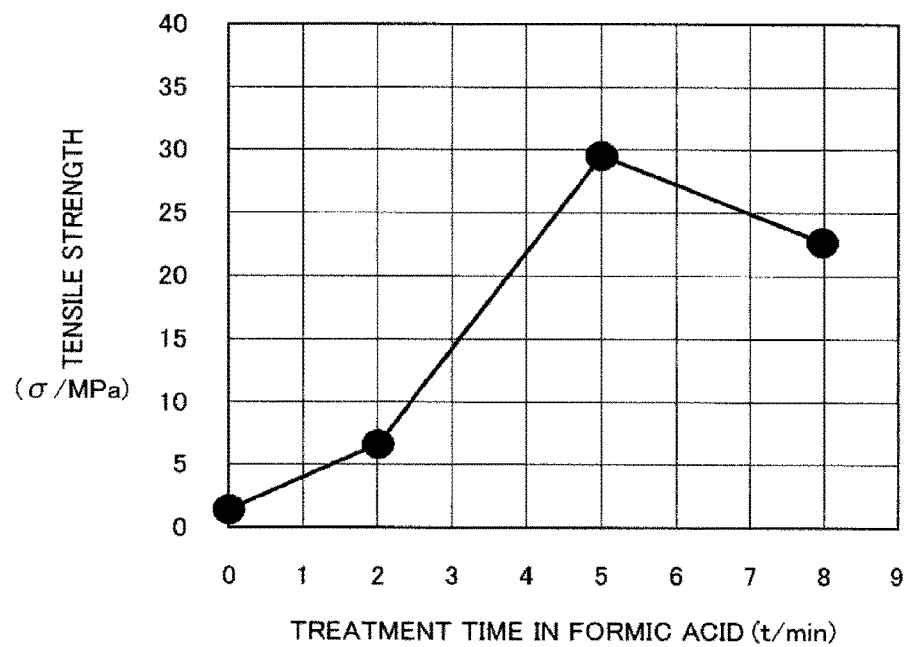
FIGS. 4A and 4B are graphs showing the relationship between treatment time in formic acid and tensile strength.
Figure 4B:
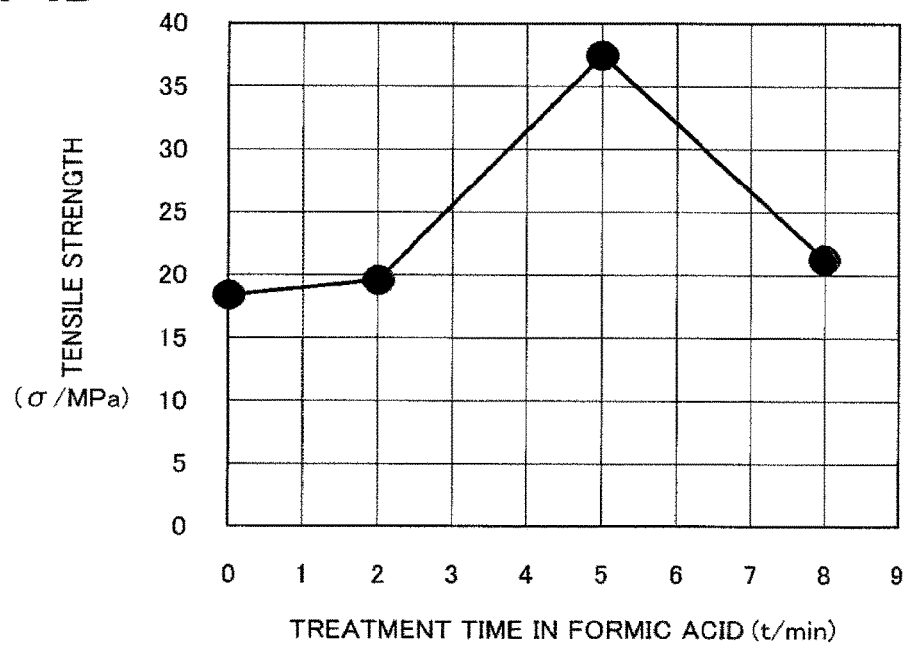

FIG. 4A is a graph showing the relationship between treatment time and tensile strength in the case where the joining temperature was 400° C., and FIG. 4B is a graph showing the relationship between treatment time and tensile strength in the case where the joining temperature was 440° C.

It is known from FIG. 4A and FIG. 4B that, in both the case where the joining temperature was 400° C. and the case where the joining temperature was 440° C., the samples having a treatment time of 5 minutes have the largest tensile strength, and the tensile strength diminishes when the treatment time increases to 8 minutes.

It is presumed that the reason the tensile strength diminishes when the treatment time increases is because when the treatment time becomes long, excessive organic acid salt will be generated, and therefore a large number of bubbles will be generated on the joining surfaces due to the occurrence of gas caused by decomposition of the organic acid salt.

Further, it is known that, by optimizing the treatment time to 5 minutes, in the case where the joining temperature is 400° C., a tensile strength of more than 30 times of that of the case of no treatment can be obtained (as shown in FIG. 4A), while in the case where the joining temperature is 440° C., a tensile strength of more than 2 times of that of the case of no treatment can be obtained (as shown in FIG. 4B).

(Discussion on Thickness of Sheet)

Next, discussion on how to determine the thickness of the sheet was made as below.

First, zinc sheets were prepared respectively for different thicknesses of: 0.1 mm, 0.4 mm, 0.8 mm and 2.0 mm.

The chemical composition of the zinc sheet of each of the aforesaid thicknesses is listed in Table 2 to Table 5 as below. Table 2 shows the chemical composition of the zinc sheet with a thickness of 0.1 mm, Table 3 shows the chemical composition of the zinc sheet with a thickness of 0.4 mm, Table 4 shows the chemical composition of the zinc sheet with a thickness of 0.8 mm, and Table 5 shows the chemical composition of the zinc sheet with a thickness of 2.0 mm.

TABLE 2

| | Elements | | | | |
|---|---|---|---|---|---|
| | Cu | Pb | Fe | Cd | Zn |
| Mass % | <0.0003 | <0.003 | <0.0003 | <0.002 | Bal. |

TABLE 3

| | Elements | | | | |
|---|---|---|---|---|---|
| | Cu | Pb | Fe | Cd | Zn |
| Mass % | 0.0009 | 0.0004 | <0.0004 | <0.0002 | Bal. |

TABLE 4

| | Elements | | | | |
|---|---|---|---|---|---|
| | Cu | Pb | Fe | Cd | Zn |
| Mass % | 0.0010 | 0.0019 | <0.0003 | <0.0003 | Bal. |

TABLE 5

| | Elements | | | | |
|---|---|---|---|---|---|
| | Cu | Pb | Fe | Cd | Zn |
| Mass % | <0.0010 | 0.0005 | <0.0003 | <0.0003 | Bal. |

Sheets 21 used to join the metal members were prepared for each of the zinc sheets with aforesaid thicknesses while the formic acid treatment time was fixed to 5 minutes, for which the largest tensile strength can be obtained both in FIG. 4A and FIG. 4B.

Further, two A5052 aluminum alloys 1, 2 were joined to each other with the sheet 21 sandwiched between the joining surfaces of thereof. The joint was prepared for each of the sheets obtained by treating the zinc sheets having the aforesaid different thicknesses with formic acid, in both the case where the joining temperature is 400° C. and the case where the joining temperature is 440° C. respectively.

Similarly, for the zinc sheets has not subjected to formic acid treatment, the joint was prepared for each of the zinc sheets with the aforesaid different thicknesses, in both the case where the joining temperature is 400° C. and the case where the joining temperature is 440° C. respectively. Further, joints were prepared by joining the two A5052 aluminum alloys 1, 2 without using the zinc sheet.

The tensile test was performed to measure the tensile strength σ for each of the joints obtained by joining the two A5052 aluminum alloys 1, 2.

Figure 5A:
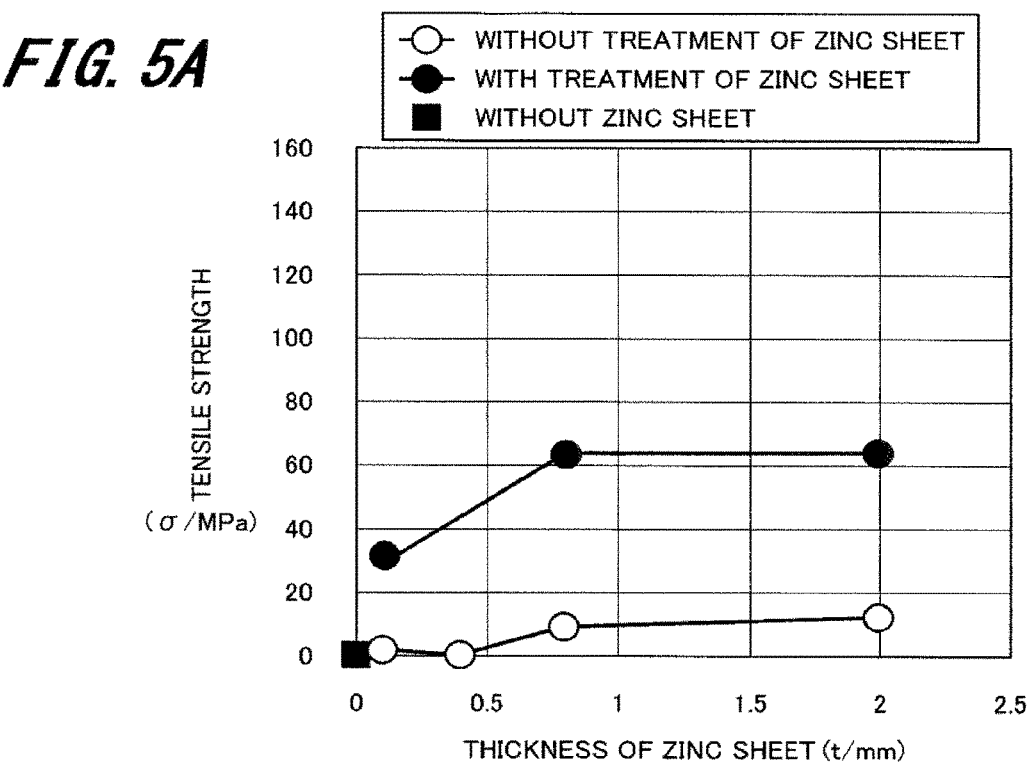
FIGS. 5A and 5B are graphs showing the relationship between thickness of a zinc sheet, presence of the treatment of the zinc sheet, and tensile strength.
Figure 5B:
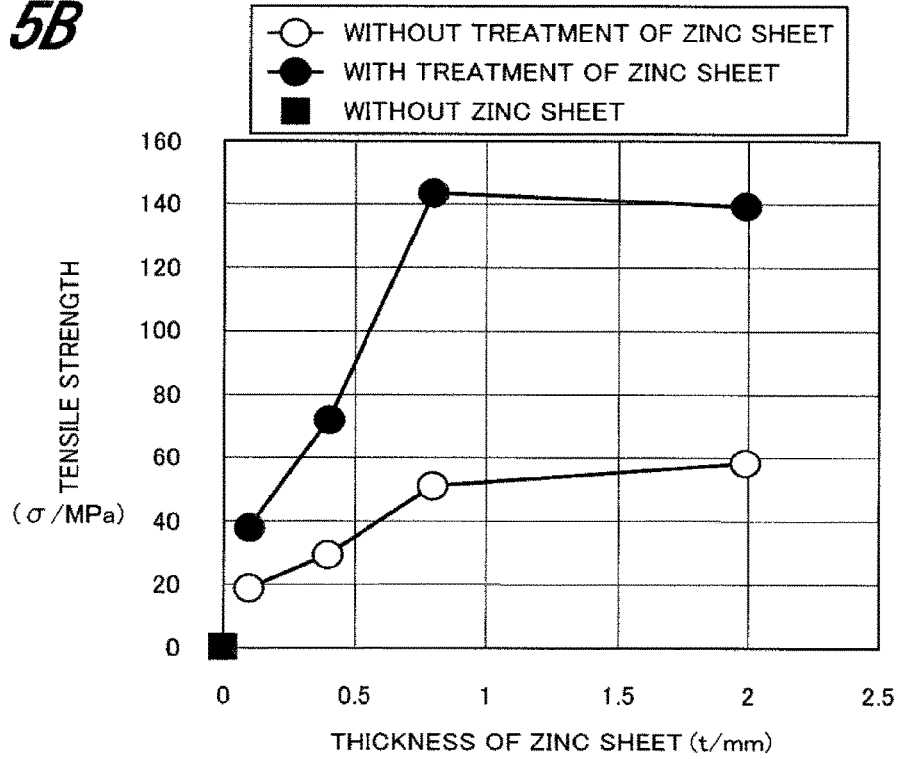

FIG. 5A is a graph showing the relationship between thickness of the zinc sheet, presence of the treatment of the zinc sheet, and tensile strength in the case where the joining temperature was 400° C., and FIG. 5B is a graph showing the relationship between thickness of the zinc sheet, presence of the treatment of the zinc sheet, and tensile strength in the case where the joining temperature was 440° C.

It is known from FIG. 5A and FIG. 5B that, no matter whether or not the zinc sheet has been subjected to the treatment in the formic acid, the tensile strength increases along with the increasing of the thickness of the zinc sheet. However, the increasing the tensile strength slows down when the thickness of the zinc sheet excesses 0.8 mm.

It is known from FIG. 5A that, in the case where the joining temperature is 400° C., by boiling the zinc sheet in formic acid, a joint with five times tensile strength can be obtained compared with a case where a zinc sheet not subjected to the treatment is used. It is known from FIG. 5B that, in the case where the joining temperature is 440° C., by boiling the zinc sheet in formic acid, a joint with three times tensile strength can be obtained compared with a case where a zinc sheet not subjected to the treatment is used.

Incidentally, the tensile strength of the joints obtained by joining the two A5052 aluminum alloys 1, 2 without using the zinc sheet was 0.06 MPa in the case where the joining temperature was 400° C. and 2.01 MPa in the case where the joining temperature was 440° C.

It is presumed that the reason the tensile strength increases along with the increasing of the thickness of the zinc sheet is because melted zinc is pushed out from the joining surfaces, and the larger the thickness of the zinc sheet is, the more the oxide film on the surface of the metal members to be joined will be pushed out along with the melted zinc.

It is known by comparing FIG. 5A with FIG. 5B that the tensile strength obtained at the joining temperature of 440° C. is higher than the tensile strength obtained at the joining temperature of 400° C.

It is also known that, in the case where the zinc sheet has been subjected to a formic acid treatment, the tensile strength obtained even at a joining temperature of 400° C. is higher than that obtained at a joining temperature of 440° C. in the case where the zinc sheet has not been subjected to a formic acid treatment. Thus, it can be known based on such fact that, by treating the zinc sheet with formic acid, it is possible to obtain sufficient strength even if the joining temperature is reduced to 400° C., so that cost of the joining step can be reduced due to lower joining temperature.

(Experiment 2) Joining of High Silicon Aluminum Alloy

Figure 6:
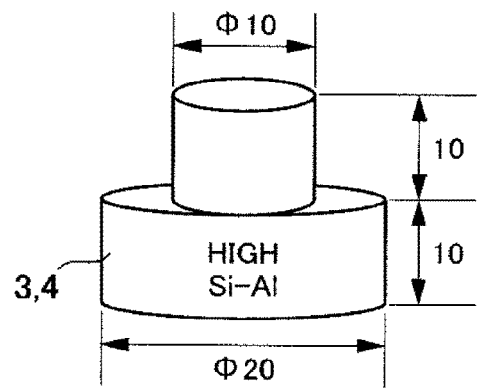
FIG. 6 is a perspective view of a sample of a high silicon aluminum alloy used in Experiment 2.

As shown in the perspective view of FIG. 6, two high silicon aluminum alloys 3, 4 were prepared as the two metal members to be joined, wherein the two high silicon aluminum alloys 3, 4 each have a cylindrical shaped lower portion with a diameter of 20 mm and a height of 10 mm, and a cylindrical shaped upper portion with a diameter of 10 mm and a height of 10 mm.

The joining surfaces of the two high silicon aluminum alloy 3, 4 were electrolytically polished.

The chemical composition of the high silicon aluminum alloy 3, 4 to be used is listed in the following Table 6.

TABLE 6

| | Elements | | | | | | | | | |
|---|---|---|---|---|---|---|---|---|---|---|
| | Si | Fe | Cu | Mn | Mg | Cr | Zn | Ti | Ni | Al |
| Mass % | 6.2 | 0.15 | 1.5 | 0.01 | 0.6 | 0.09 | 0.01 | 0.01 | 0.01 | Bal. |

The size of the zinc sheet is: breadth 12 mm×length 12 mm; and the thickness of the zinc sheet is 0.8 mm. The treatment time of the zinc sheet in formic acid is set to 5 minutes.

Figure 7:
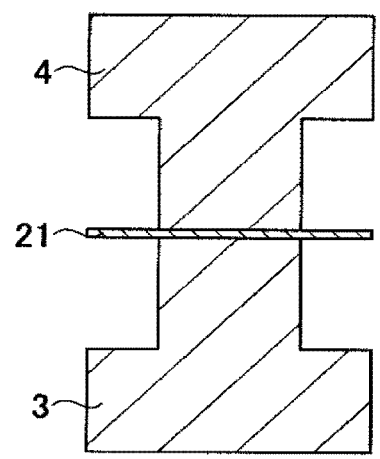
FIG. 7 is a cross-sectional view showing a joining state in Experiment 2.

Samples of the joints were prepared by the same method as that of Experiment 1 except that: the metal members were high silicon aluminum alloys 3, 4; the upper portions with smaller diameter of the two high silicon aluminum alloys 3, 4 were joined to each other with a sheet 21 sandwiched therebetween (as shown in the cross-sectional view of FIG. 7); and the joining temperature was set to 430° C. and 490° C. respectively. The samples were prepared respectively for cases of: with organic acid treatment; without organic acid treatment; and without sheet.

Two grippers were fixed to the portions with larger diameter of the two high silicon aluminum alloys 3, 4 to perform the tensile test to measure the tensile strength σ of each joint.

Figure 8A:
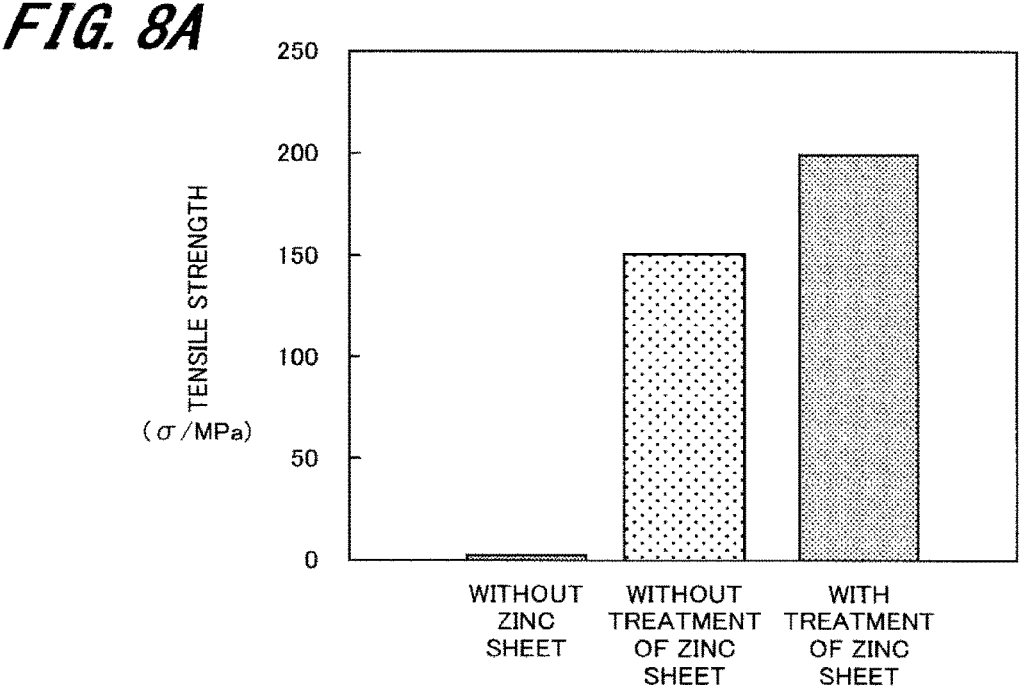
FIGS. 8A and 8B are graphs showing the relationship between presence of the treatment of the zinc sheet and tensile strength.
Figure 8B:
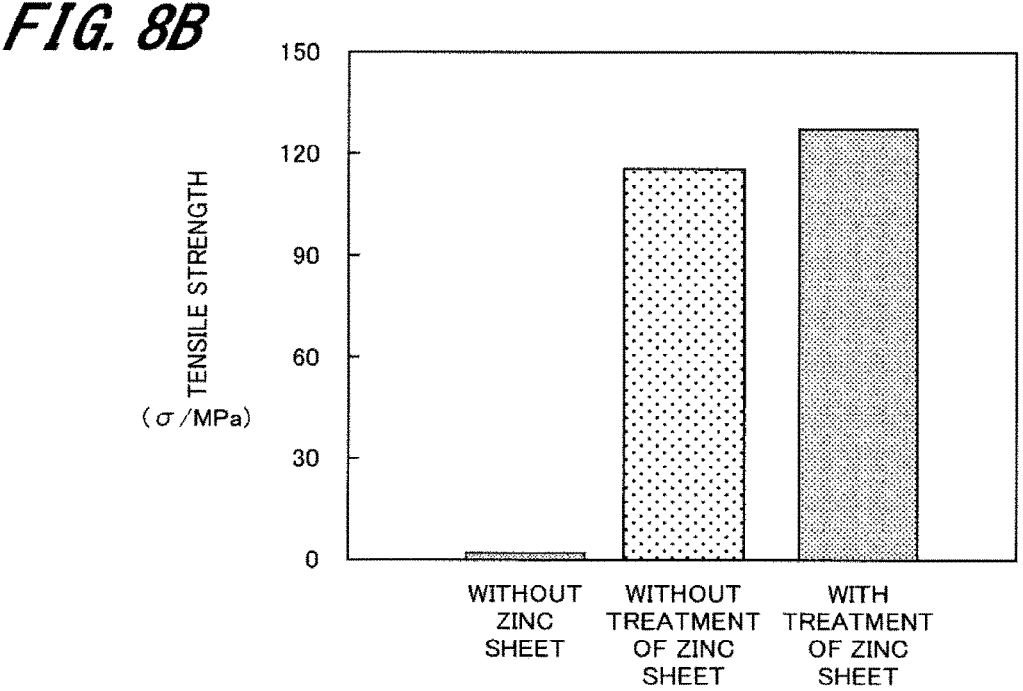

FIG. 8A is a graph showing the relationship between presence of the treatment and tensile strength in the case where the joining temperature was 430° C., and FIG. 8B is a graph showing the relationship between presence of the treatment and tensile strength in the case where the joining temperature was 490° C.

It is known from FIG. 8A and FIG. 8B that, in both the case where the joining temperature is 430° C. and the case where the joining temperature is 490° C., by boiling the zinc sheet in formic acid, tensile strength is increased compared with case where a zinc sheet not subjected to the treatment is used.

It is known from FIG. 8A that, in the case where the joining temperature was 430° C., by boiling the zinc sheet in formic acid, it is possible to obtain a joint with about 1.3 times tensile strength compared with a case where a zinc sheet not subjected to the treatment is used. It is known from FIG. 8B that, in the case where the joining temperature is 490° C., by boiling the zinc sheet in formic acid, it is possible to obtain a joint with a tensile strength of 20 MPa higher than a case where a zinc sheet not subjected to the treatment is used.

It is known by comparing FIG. 8A with FIG. 8B that the tensile strength obtained at the joining temperature of 430° C. is higher than the tensile strength obtained at the joining temperature of 490° C. Further, the effect of the formic acid treatment of the zinc sheet is better in the case where the joining temperature is 430° C. than in the case where the joining temperature is 490° C.

(Experiment 3) Joining of A6061 Aluminum Alloy

Figure 9:
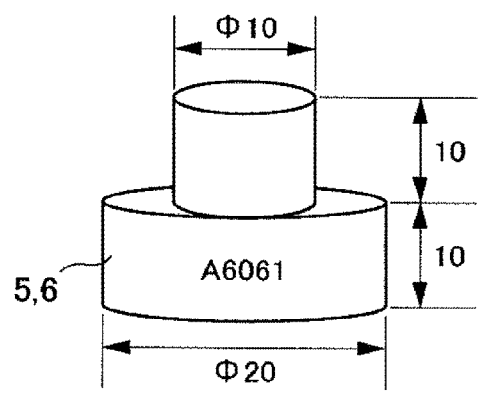
FIG. 9 is a perspective view of a sample of A6061 aluminum alloy used in Experiment 3.

As shown in the perspective view of FIG. 9, two A6061 aluminum alloys 5, 6 were prepared as the two metal members to be joined, wherein the two A6061 aluminum alloys 5, 6 each have a cylindrical shaped lower portion with a diameter of 20 mm and a height of 10 mm, and a cylindrical shaped upper portion with a diameter of 10 mm and a height of 10 mm.

The joining surfaces of the two A6061 aluminum alloys 5, 6 were electrolytically polished.

The chemical composition of the A6061 aluminum alloys 5, 6 to be used is listed in the following Table 7.

TABLE 7

| | Elements | | | | | | | | |
|---|---|---|---|---|---|---|---|---|---|
| | Si | Fe | Cu | Mn | Mg | Cr | Zn | Ti | Al |
| Mass % | 0.68 | 0.30 | 0.31 | 0.11 | 1.00 | 0.16 | 0.05 | 0.02 | Bal. |

Figure 10:
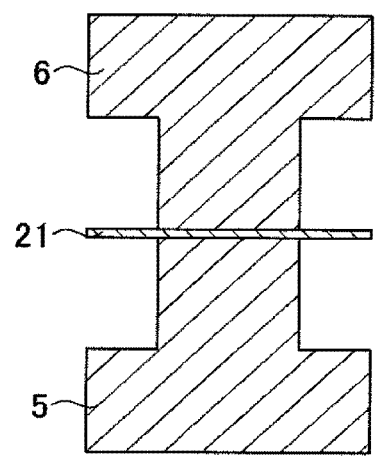
FIG. 10 is a cross-sectional view showing a joining state in Experiment 3.

Samples of the joints were prepared by the same method as that of Experiment 2 except that: the metal members were A6061 aluminum alloy 5, 6; the upper portions with smaller diameter of the A6061 aluminum alloys 5, 6 were joined to each other with a sheet 21 sandwiched therebetween (as shown in the cross-sectional view of FIG. 10); and the joining temperature was set to 430° C. and 440° C. respectively. The samples were prepared respectively for cases of: with organic acid treatment; without organic acid treatment; and without sheet.

Two grippers were fixed to the portions with larger diameter of the two A6061 aluminum alloys 5, 6 to perform tensile test to thereby measure the tensile strength σ of each of the joints.

Figure 11A:
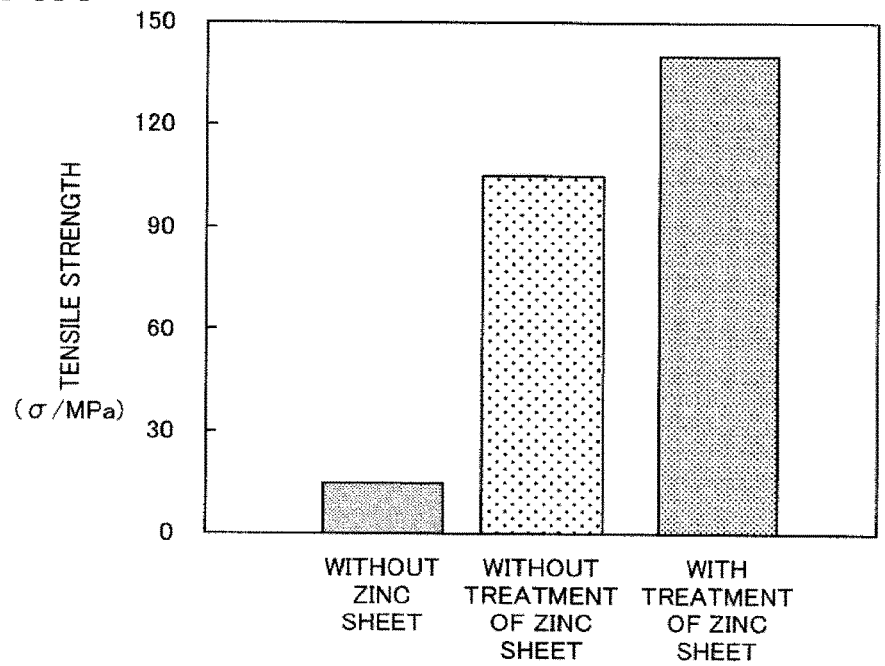
FIGS. 11A and 11B are graphs showing the relationship between presence of the treatment of the zinc sheet and tensile strength.
Figure 11B:
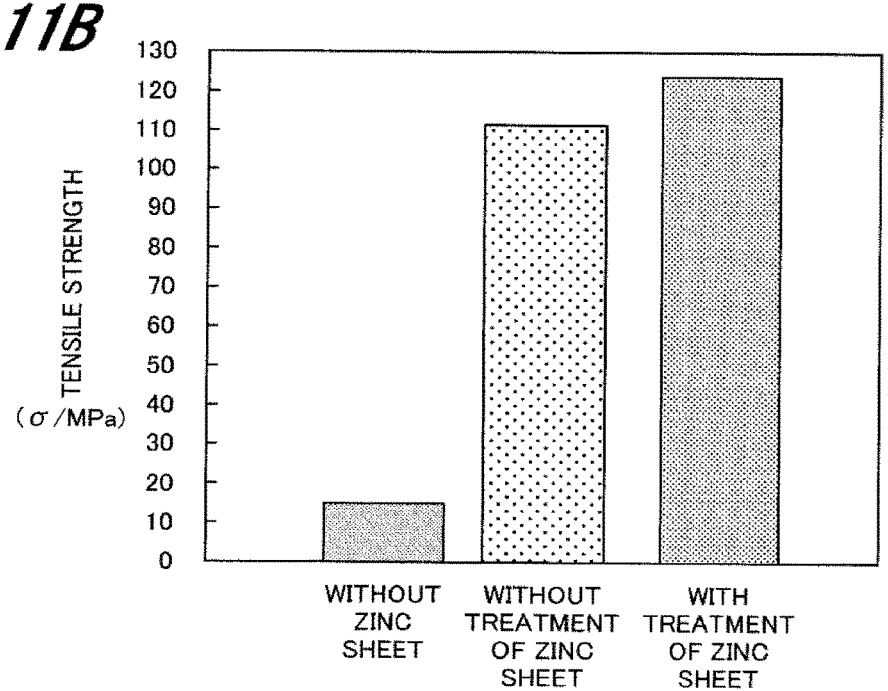

FIG. 11A is a graph showing the relationship between presence of the treatment and tensile strength in the case where the joining temperature was 430° C., and FIG. 11B is a graph showing the relationship between presence of the treatment and tensile strength in the case where the joining temperature was 440° C.

It is known from FIG. 11A and FIG. 11B that, in both the case where the joining temperature is 430° C. and the case where the joining temperature is 440° C., by boiling the zinc sheet in formic acid, tensile strength is increased compared with the case where a zinc sheet not subjected to the treatment is used.

It is known from FIG. 11A that, in the case where the joining temperature was 430° C., by boiling the zinc sheet in formic acid, a joint with about 1.3 times tensile strength can be obtained compared with a case where a zinc sheet not subjected to the treatment was used. It is known from FIG. 11B that, in the case where the joining temperature is 440° C., by boiling the zinc sheet in formic acid, it is possible to obtain a joint with a tensile strength of 15 MPa higher than a case where a zinc sheet not subjected to the treatment is used.

It is known by comparing FIG. 11A with FIG. 11B that the effect of the formic acid treatment of the zinc sheet is better in the case where the joining temperature is 430° C. than in the case where the joining temperature is 440° C.

(Experiment 4) Acetic Acid Treatment

Tensile strength was measured in the same manner as the case where the zinc sheet was treated with formic acid, except that the organic acid was changed from formic acid to acetic acid.

A5052 aluminum alloys 1, 2 identical to those of Experiment 1 were used as the metal members.

(Discussion on Optimal Treatment Time)

First, discussion on optimal treatment time of the acetic acid treatment was made as below.

Sheets 21 used to join the metal members were prepared respectively for different acetic acid treatment times of: 0 minute (i.e., without treatment), 2 minutes, 8 minutes, 12 minutes and 18 minutes, while the thickness of the zinc sheets was fixed to 0.1 mm.

Further, two A5052 aluminum alloys 1, 2 were joined to each other with the sheet 21 sandwiched between the joining surfaces of the A5052 aluminum alloys 1, 2. The joint was prepared for each of aforesaid different acetic acid treatment times, while the joining temperature was set to 440° C.

The tensile test was performed in the same manner as Experiment 1 to measure the tensile strength σ for each of the joints obtained by joining the two A5052 aluminum alloys 1, 2.

Figure 12:
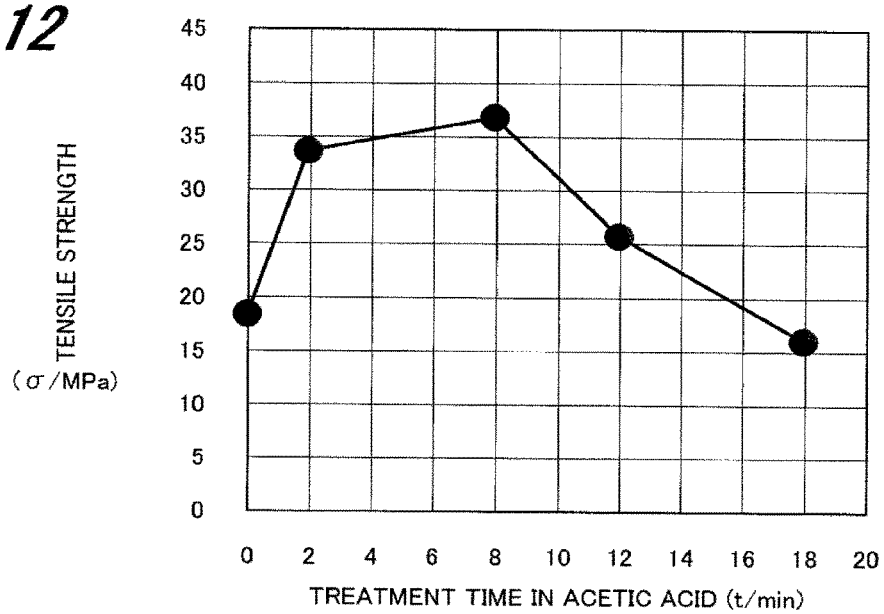
FIG. 12 is a graph showing the relationship between treatment time in acetic acid and tensile strength.

FIG. 12 is a graph showing the relationship between the treatment time and the tensile strength.

It is known from FIG. 12 that the sample having a treatment time of 8 minutes have the largest tensile strength, and the tensile strength diminishes when the treatment time increases to 12 minutes. The optimal treatment time is 8 minutes, which is longer than the optimal treatment time of 5 minutes in the case of the formic acid treatment.

(Discussion on Thickness of Sheet)

Next, discussion on how to determine the thickness of the sheet was made as below.

First, zinc sheets were prepared respectively for different thicknesses of: 0.1 mm, 0.8 mm and 2.0 mm.

Sheets 21 used to join the metal members were prepared for each of the zinc sheets with aforesaid thicknesses, while the acetic acid treatment time was fixed to 8 minutes for which the largest tensile strength was obtained in FIG. 12.

Further, two A5052 aluminum alloys 1, 2 were joined to each other with the sheet 21 sandwiched between the joining surfaces of the A5052 aluminum alloys 1, 2. The joint was prepared for each of the sheets obtained by treating the zinc sheets with the aforesaid different thicknesses, while the joining temperature was set to 440° C.

The tensile test was performed to measure the tensile strength σ for each of the joints obtained by joining the two A5052 aluminum alloys 1, 2.

Figure 13:
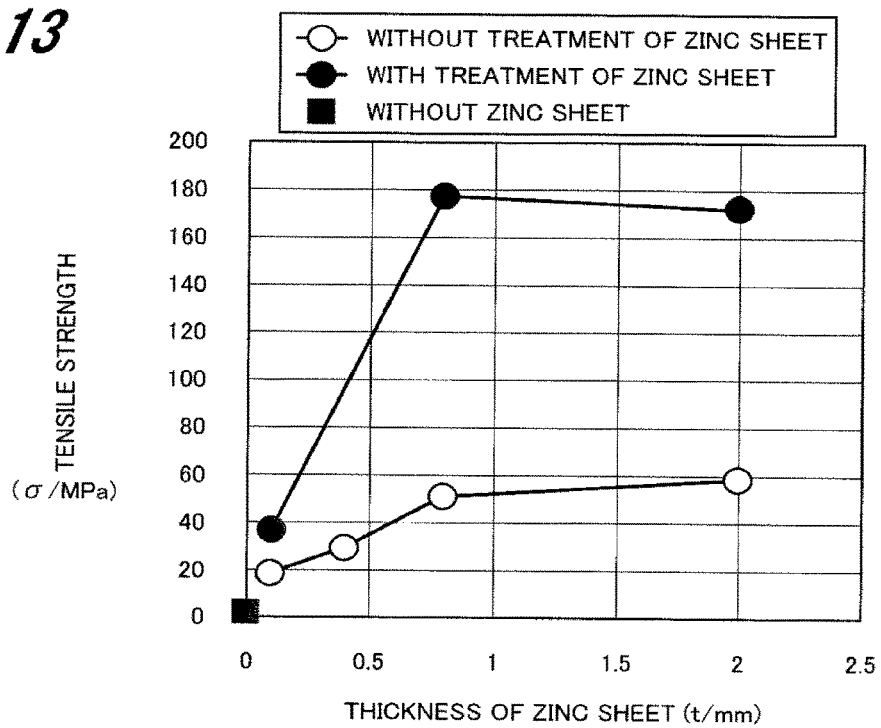
FIG. 13 is a graph showing the relationship between thickness of the zinc sheet, presence of the treatment of the zinc sheet, and tensile strength.

FIG. 13 is a graph showing the relationship between thickness of the zinc sheet, presence of the treatment of the zinc sheet, and tensile strength. Incidentally, in FIG. 13, data associated with sheet without treatment and data associated with the case where the thickness of sheet is 0 (i.e., without sheet) are identical to the data used in FIG. 5B, and the tensile strength of the sample without using sheet is 2.01 MPa.

It is known from FIG. 13 that, in the case the zinc sheet is treated with acetic acid, the tensile strength also increases along with the increasing of the thickness of the zinc sheet, and the increasing the tensile strength slows down when the thickness of the zinc sheet excesses 0.8 mm.

It is also known from FIG. 13 that, in the case where the joining temperature is 440° C., by boiling the zinc sheet in acetic acid, a joint with four times tensile strength can be obtained compared with a case where a zinc sheet not subjected to the treatment is used.

Figure 14:
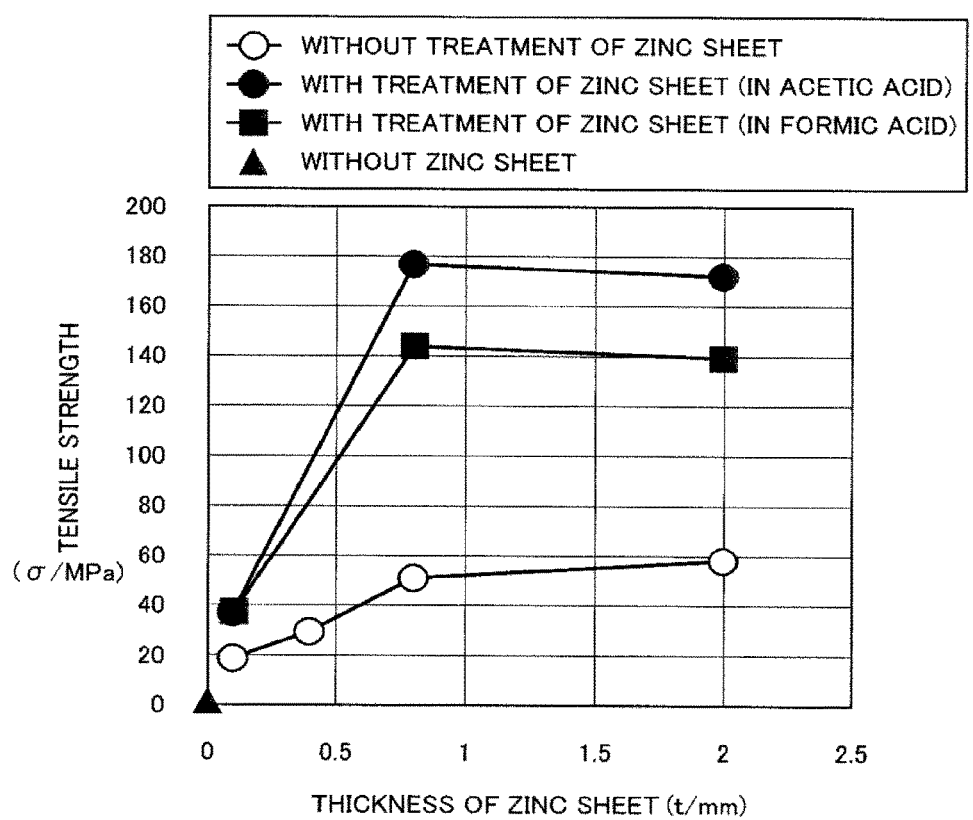
FIG. 14 is a graph showing the relationship between thickness of the zinc sheet, presence of the treatment of the zinc sheet, and tensile strength, for both cases where the treatment is performed in formic acid and where the treatment is performed in acetic acid.

The results of the formic acid treatment shown in FIG. 5B and the results of the acetic acid treatment shown in FIG. 13B are collectively shown in FIG. 14.

It is known from FIG. 14 that higher strength can be achieved in the case where the zinc sheet is treated with acetic acid than the case where the zinc sheet is treated with formic acid.

REFERENCE SIGNS LIST

1, 2 A5052 aluminum alloy
3, 4 high silicon aluminum alloy
5, 6 A6061 aluminum alloy
21 sheet

The invention claimed is:

1. A method of joining metal members, the method comprising:
   joining a plurality of metal members to each other with a sheet sandwiched between joining surfaces of the metal members, wherein the sheet is obtained by forming an organic acid metal salt film on the surface of a metal sheet,
   wherein the metal members comprise aluminum or an aluminum alloy,
   wherein the metal sheet comprises a zinc sheet having a thickness of 0.1-0.8 mm, and
   wherein the sheet comprises a sheet obtained by forming an organic acid zinc film on the surface of the zinc sheet.

2. The method of claim 1, wherein the forming of the organic acid zinc film on the surface of the zinc sheet comprises boiling the zinc sheet in an organic acid.

3. The method of claim 1, wherein the forming of the organic acid zinc film on the surface of the zinc sheet comprises spraying or applying an organic acid to the zinc sheet.

4. The method of claim 1, wherein the forming of the organic acid zinc film on the surface of the zinc sheet comprises contacting the zinc sheet with an organic acid selected from the group consisting of formic acid, acetic acid, citric acid, and stearic acid.

5. The method of claim 1, wherein the metal members comprise aluminum.

6. The method of claim 1, wherein the metal members comprise an aluminum alloy.

7. The method of claim 4, wherein the organic acid comprises formic acid.

8. The method of claim 4, wherein the organic acid comprises acetic acid.

9. The method of claim 4, wherein the organic acid comprises citric acid.

10. The method of claim 4, wherein the organic acid comprises stearic acid.

* * * * *